(12) United States Patent
Potter et al.

(10) Patent No.: US 11,903,404 B2
(45) Date of Patent: Feb. 20, 2024

(54) APPARATUS AND METHOD FOR DISPENSING FLAVOURING

(71) Applicant: ISHIDA EUROPE LIMITED, Birmingham (GB)

(72) Inventors: Andrew Geoffrey Potter, Oldbury (GB); Lee Michael Vine, Poole (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 0 days.

(21) Appl. No.: 17/772,089

(22) PCT Filed: Oct. 28, 2020

(86) PCT No.: PCT/GB2020/052726
§ 371 (c)(1),
(2) Date: Apr. 26, 2022

(87) PCT Pub. No.: WO2021/084248
PCT Pub. Date: May 6, 2021

(65) Prior Publication Data
US 2022/0378081 A1 Dec. 1, 2022

(30) Foreign Application Priority Data

Oct. 30, 2019 (GB) .................................... 1915763

(51) Int. Cl.
*A23P 20/12* (2016.01)
*B65D 83/06* (2006.01)
*B30B 15/32* (2006.01)

(52) U.S. Cl.
CPC .............. *A23P 20/12* (2016.08); *B30B 15/32* (2013.01); *B65D 83/06* (2013.01)

(58) Field of Classification Search
CPC ......... A23P 20/12; B30B 15/32; B65D 83/06; B65B 2220/14; A23L 19/18; A23L 27/00; A23L 27/20; A23G 9/245
(Continued)

(56) References Cited

U.S. PATENT DOCUMENTS 2,858,761 A * 11/1958 Denniss .................. A23L 7/187
99/477
3,152,010 A * 10/1964 Case .................... A47J 37/1271
118/31
(Continued)

FOREIGN PATENT DOCUMENTS

WO WO 2002/041715 A2 5/2002
WO WO 2018/091908 A1 5/2018

OTHER PUBLICATIONS

International Search Report for PCT International Application No. PCT/GB2020/052726, 3 pages, dated Jan. 29, 2021.

*Primary Examiner* — Jethro M. Pence
(74) *Attorney, Agent, or Firm* — SQUIRE PATTON BOGGS (US) LLP

(57) ABSTRACT

A flavouring dispenser for dispensing compacted doses of flavouring comprises a flavouring dosage unit configured to dispense a dose of flavouring and a plurality of compacting hoppers, each configured to receive and hold a dose of flavouring dispensed from the flavouring dosage unit and to subsequently dispense the dose of flavouring to a dispense position. The flavouring dosage unit and the plurality of compacting hoppers are configured such that the flavouring dosage unit sequentially supplies a dose of flavouring to each of the plurality of compacting hoppers.

15 Claims, 8 Drawing Sheets

(58) Field of Classification Search
USPC .......................................................... 118/13
See application file for complete search history.

(56) References Cited

U.S. PATENT DOCUMENTS

| | | | | |
|---|---|---|---|---|
| 4,270,486 A * | 6/1981 | Leverenz | ................ | A23P 20/12 |
| | | | | 118/679 |
| 4,421,770 A * | 12/1983 | Wiker | ................ | A23L 15/20 |
| | | | | 426/103 |
| 4,755,390 A * | 7/1988 | Calandro | ................ | A23L 7/122 |
| | | | | 426/620 |
| 5,287,801 A * | 2/1994 | Clark | ................ | B05B 13/025 |
| | | | | 222/311 |
| 5,353,994 A * | 10/1994 | Clark | ................ | A23P 20/13 |
| | | | | 239/689 |
| 5,679,390 A * | 10/1997 | Conover | ............ | A23L 27/2028 |
| | | | | 426/289 |
| 5,768,984 A * | 6/1998 | Gallego | ................ | A23B 4/325 |
| | | | | 118/16 |
| 5,855,671 A * | 1/1999 | Scherping | ............ | A01J 25/008 |
| | | | | 99/452 |
| 5,988,052 A * | 11/1999 | Abler | ................ | A01J 25/11 |
| | | | | 99/452 |
| 6,026,740 A * | 2/2000 | Abler | ................ | A01J 25/005 |
| | | | | 99/452 |
| 6,553,931 B2 * | 4/2003 | Graham | ................ | A23P 20/12 |
| | | | | 118/308 |
| 6,591,777 B2 * | 7/2003 | Cameron | ............ | A23G 3/2076 |
| | | | | 118/308 |
| 7,350,339 B2 * | 4/2008 | Yakushigawa | .......... | A23P 20/18 |
| | | | | 53/551 |
| 7,464,661 B2 * | 12/2008 | Baas | ...................... | A23P 20/13 |
| | | | | 118/19 |
| 7,597,062 B2 * | 10/2009 | Fetterhoof | .............. | A23L 13/50 |
| | | | | 118/308 |
| 7,975,642 B2 * | 7/2011 | Rudesill | .................. | A23P 20/10 |
| | | | | 118/308 |
| 8,051,795 B2 * | 11/2011 | Dorsten | .............. | A47J 37/1219 |
| | | | | 118/308 |
| 8,910,586 B2 * | 12/2014 | Redler | .................. | A47G 19/34 |
| | | | | 118/31 |
| 9,254,052 B2 * | 2/2016 | Villarreal | ................ | A47G 19/34 |
| 9,541,438 B2 * | 1/2017 | Redler | .................... | A23P 20/12 |
| 10,508,944 B2 * | 12/2019 | Vine | ...................... | G01F 11/18 |
| 10,925,308 B2 * | 2/2021 | Vardakostas | ............ | A21C 9/04 |
| 2002/0144650 A1 * | 10/2002 | Cameron | ............ | A23G 3/2076 |
| | | | | 118/19 |
| 2004/0244681 A1 * | 12/2004 | Kitagawa | ................ | A23P 20/17 |
| | | | | 118/19 |
| 2006/0286220 A1 * | 12/2006 | King | .................... | B05B 5/1683 |
| | | | | 426/235 |
| 2012/0196012 A1 * | 8/2012 | Bazaldua | ................ | A23P 20/12 |
| | | | | 118/13 |
| 2017/0119199 A1 | 5/2017 | Williston et al. | | |
| 2022/0151280 A1 * | 5/2022 | Nothum, Jr. | .......... | B05C 5/0283 |

* cited by examiner

APPARATUS AND METHOD FOR DISPENSING FLAVOURING

CROSS-REFERENCE TO RELATED APPLICATIONS

This application is a national-phase filing under 37 USC 371(c) of International Application No. PCT/GB2020/052726, filed Oct. 28, 2020, which claims priority to, and the benefit of, Great Britain Application GB1915763.5, filed Oct. 30, 2019. The entire contents of each of these applications are incorporated herein by reference in their entirety for all purposes.

FIELD OF THE INVENTION

The present invention is directed to an apparatus and method for dispensing flavouring, and in particular solid granular flavourings such as salt or other potato chip or crisp flavourings.

DESCRIPTION OF THE RELATED ART

In the field of flavouring food products, such as potato chips or crisps, there is a desire to flavour individual batches of food after they have been measured out and immediately before they are packaged. This minimises the required cleaning between flavouring changes since it ensures any apparatuses for measuring out the batches of food product do not become coated in flavouring. However, this has meant it is necessary to measure out and dispense relatively small doses of flavouring. That is, it is necessary to dispense an amount of flavouring appropriate for a single batch of food product, e.g. flavouring for a single bag of potato chips or crisps. In order to maintain throughput, it is necessary to apply flavouring to these individual batches relatively quickly. A suitable system for high-throughput processing of individual batches of food product may be found in WO 2018/091908 A1.

Fast and efficient coating of product in flavouring typically requires the flavouring to be delivered in a compact dose so that the flavouring quickly and uniformly adheres to the product. However, flavourings, such as particulate and liquid flavourings, require a certain amount of time to coalesce and compact. When working at the high-throughput speeds required for individual batch processing, this compacting time can become a limiting factor on the overall throughput of the packaging system. Accordingly, there is a need in the art for methods and apparatuses that can quickly measure out and dispense small and compact doses of flavouring.

SUMMARY OF THE INVENTION

In accordance with a first aspect of the present invention, there is provided a flavouring dispenser for dispensing compacted doses of flavouring, the flavouring dispenser comprising: a flavouring dosage unit configured to dispense a dose of flavouring; a plurality of compacting hoppers, each configured to receive and hold a dose of flavouring dispensed from the flavouring dosage unit and to subsequently dispense the dose of flavouring to a dispense position; wherein the flavouring dosage unit and the plurality of compacting hoppers are configured such that the flavouring dosage unit sequentially supplies a dose of flavouring to each of the plurality of compacting hoppers.

Whenever a dose of flavouring is measured and dispensed in a short space of time, as is required when producing many small doses of flavouring, the dose typically does not have time to coalesce and compact to form a compact dose of flavouring that is particularly suited to use in flavouring individual batches of food product. The system according to the first aspect addresses this need for compacting time by providing a plurality of compacting hoppers, each individually and sequentially supplied by a flavouring dosage unit. The use of a plurality of compacting hoppers essentially provides a buffer, increasing the dwell time of the flavouring before it is finally dispensed. That is, each compacting hopper receives and holds a dose of flavouring for a period of time so as to allow the dose to compact. One compacting hopper may be holding the flavouring so as to form a compact dose, while a second hopper is receiving its own dose of flavouring. This minimises the downtime experienced by the flavouring dosage unit and maintains a high overall throughput of flavouring through the system.

As noted above, the flavouring dosage unit and the plurality of compacting hoppers are configured such that the flavouring dosage unit sequentially supplies a dose of flavouring to each of the plurality of compacting hoppers. More detailed arrangements for achieving this are described in more detail below. However, it will be understood that the term "sequentially" in the present context means that two compacting hoppers do not simultaneously receive a dose of flavouring, i.e. over the same period of time. Instead, typically a first compacting hopper will receive a dose of flavouring and then a second compacting hopper receives a dose of flavouring. Preferably, the second compacting hopper only begins to receive flavouring after the first compacting hopper has received a complete dose of flavouring, although in some cases there could be some overlap. It will also be appreciated that any sequence of filling the compacting hoppers may be employed, so long as each compacting hopper receives and dispenses at least one dose of flavouring during one dosing cycle of the flavouring dispenser.

In many embodiments, the flavouring dosage unit comprises a flavouring supply portion configured to gradually supply the flavouring forming each dose of flavouring. That is, the flavouring dosage unit is configured such that a dose of flavouring is dispensed by the flavouring supply portion over a longer period of time than is taken for a dose of flavouring to be dispensed from one of the plurality of compacting hoppers. A common way to build up a dose of flavouring having a known weight is to gradually supply the flavouring to a weighing receptacle until the desired weight is met. Alternatively, flavouring may be supplied by means, such as an auger, which can reasonably accurately dispense flavouring at a predetermined rate, such that a known weight will be built up over a predetermined amount of time. In either of these cases, it takes a certain amount of time for the gradually dispensed flavouring to coalesce and compact into a compact dose suitable for flavouring an individual batch of flavouring and the present system enables these gradual flavouring supplies to be used for forming small doses while maintaining a fast throughput and ensuring compact doses are dispensed. As mentioned above, the flavouring dosage unit comprises a flavouring supply portion configured to gradually supply flavouring. For example, the flavouring supply portion may supply flavouring substantially continuously. The compacting hoppers may thereby receive the dose of flavouring over a relatively long period of time, before allowing the dose to compact and then relatively quickly dispensing the dose of flavouring. As mentioned above, a preferable form of flavouring supply portion would be an auger.

As mentioned above, in many cases, the flavouring dosage unit will comprise a flavouring supply portion that gradually supplies flavouring. In some embodiments, the flavouring may be gradually supplied directly to the compacting hoppers. However, preferably, the flavouring dosage unit comprises a holding hopper arranged to receive and hold the flavouring gradually supplied by the flavouring supply portion, and wherein the holding hopper periodically dispenses the supplied flavouring for receipt in one of the plurality of compacting hoppers, such that the flavouring dosage unit periodically dispenses doses of flavouring. Here, it should be appreciated that the term "periodically" may refer to a holding hopper that dispenses at regular predetermined intervals, such as after a set period of time, or irregular intervals, such as only when certain dispense criteria are met. A holding hopper of this sort may allow the flavouring supply portion to continuously or substantially continuously supply flavouring, thereby maximising throughput of the system. For example, in the absence of a holding hopper, the flavouring supply portion may be required to pause once a first hopper has received a dose of flavouring, before it can begin filling a second empty compacting hopper with a subsequent dose of flavouring. That is, the holding hopper may be arranged in a closed position while any reconfiguring of compacting hoppers to be filled takes place such that the flavouring supply portion need not pause its supplying of flavouring. In some embodiments, the holding hopper may be configured to weigh the flavouring, thereby establishing a dose of flavouring. In other embodiments, the dose of flavouring may be established by a certain duration of gradual dispensing of flavouring by the flavouring supply portion.

Preferably, the flavouring dosage unit comprises a dispensing portion from which the dose of flavouring is dispensed for receipt in one of the plurality of compacting hoppers, and wherein the dispensing portion of the flavouring dosage unit and the plurality of compacting hoppers are movable relative to one another such that the flavouring dosage unit sequentially supplies a dose of flavouring to each of the plurality of compacting hoppers. Relative movement of the dispensing portion and the compacting hoppers provides a convenient way of sequentially filling each of the plurality of compacting hoppers. While preferable, the dosage unit could alternative comprise a respective dispensing portion for each compacting hopper and sequentially fill the compacting hoppers by activating these in sequence.

While any relative movement may be used, it is preferred that the compacting hoppers are movable, while the flavouring dosage unit remains stationary during use. Therefore, preferably each of the plurality of compacting hoppers is sequentially movable from a first position, at which the compacting hopper receives flavouring dispensed from the flavouring dosage unit, to a second position laterally offset from the first position, at which the compacting hopper dispenses the compacted dose of flavouring. Typically, the first position is the same position for each of the plurality of compacting hoppers. In many cases, the second position for each compacting hopper is the dispense position, although guiding means could alternatively be provided for guiding flavouring from a compacting hopper at a remote second position to the dispense position. In a particularly preferred configuration, each of the plurality of compacting hoppers is movable about a closed path sequentially between the first position and the second position. In these embodiments, the compacting hoppers move around a closed path from the first position, at which they receive a dose of flavouring, to the second position, at which they dispense the dose of flavouring, before returning to the first position for a subsequent dose of flavouring. The travel time between the first and second positions allows the flavouring to compact before discharge. The closed path allows the second position to be arranged at a distance more than 180° of a full cycle of the closed path away from the first position, thereby providing a relatively long compacting time.

In particularly preferable embodiments in which the compacting hoppers move about a closed path, the plurality of compacting hoppers are coupled to one another such that movement of one of the plurality of compacting hoppers away from the first position causes movement of another compacting hopper towards the first position. Coupling the plurality of compacting hoppers further simplifies construction and may mean that only one drive source is needed to move all of the plurality of compacting hoppers. For example, each of the plurality of compacting hoppers may be mounted on a rotatable support, and rotation of the rotatable support may cause each of the plurality of compacting hoppers to move sequentially between the first position and the second position about a substantially circular path.

In some embodiments, the flavouring dosage unit may gradually fill each compacting hopper in turn with flavouring, such as by directly filling the compacting hoppers from a flavouring supply portion. In such an embodiment, preferably each compacting hopper comprises an upper opening through which flavouring is received and the upper opening of each compacting hopper abuts the upper opening of the or each adjacent compacting hopper such that flavouring may be substantially continuously dispensed by the flavouring dosage unit and received in one of the compacting hoppers during the relative movement of the dispensing portion of the flavouring dosage unit and the plurality of compacting hoppers. For example, the upper opening of each compacting hopper may provided by a funnel member of the compacting hopper, with one funnel member abutting the funnel member of the or each adjacent compacting hopper. This arrangement provides one way in which the flavouring supply portion ma continuously or substantially continuously dispense flavouring, thereby maximising throughput of the system.

In embodiments comprising relative movement of the flavouring dosage unit and the plurality of compacting hoppers, the relative movement of the dispensing portion of the flavouring dosage unit and the plurality of compacting hoppers may substantially continuous. In alternative embodiments, the relative movement may comprise an indexed movement of the dispensing portion of the flavouring dosage unit relative to the plurality of compacting hoppers. Continuous movement may have an advantageous agitating effect on the flavouring, helping certain types of flavouring to compact. On the other hand, indexed movement may improve throughput in some embodiments, maximising the time a compacting hopper is located at the first position, i.e. the position at which flavouring is received.

The above embodiments have been described with reference to a non-specific plurality of compacting hoppers, which may be two or more compacting hoppers. Preferably, the plurality of compacting hoppers comprises at least a first compacting hopper, a second compacting hopper and a third compacting hopper, and wherein further preferably the plurality of compacting hoppers further comprises at least a fourth compacting hopper. It will be appreciated that the present system effectively provides a buffer between filling of the compacting hopper and discharge of the dose of flavouring. The size of this buffer may be increased by providing additional compacting hoppers, thereby providing additional compacting time and achieving more compact doses. For example, in a system with only two compacting hoppers, to maintain throughput, a first compacting hopper would have to dispense its dose once a second compacting hopper has received its complete dose so that it can be available to receive a subsequent dose of flavouring. By providing a third compacting hopper, the length of time between any one compacting hopper receiving its dose and having to dispense its dose so as to be available for a subsequent dose is increased. For example, the flavouring dosage unit and the plurality of compacting hoppers may be configured such that the first compacting hopper receives a dose of flavouring from the flavouring dosage unit and subsequently holds the dose of flavouring while the second compacting hopper receives a dose of flavouring from the flavouring dosage unit, and wherein the first compacting hopper subsequently dispenses the dose of flavouring at least after the third compacting hopper begins to receive a dose of flavouring from the flavouring dosage unit.

Where a third compacting is provided, sequentially supplying a dose of flavouring to each of the plurality of compacting hoppers may comprise a first compacting hopper receiving a dose of flavouring, and then a second compacting hopper receiving a dose of flavouring, and then a third compacting hopper receiving a dose of flavouring. Preferably, the second compacting hopper only begins to receive flavouring after the first compacting hopper has received a complete dose of flavouring and the third compacting hopper only begins to receive flavouring after the second compacting hopper has received a complete dose of flavouring, although in some cases there could be some overlap. Again, any sequence of providing doses of flavouring to the compacting hoppers may be used.

In many embodiments, the flavouring dispenser further comprises a control unit configured to control the flavouring dosage unit and the plurality of compacting hoppers. For example, the control unit may control any flavouring supply portion, determining when flavouring is gradually supplied, may control any holding hopper, determining when the dose of flavouring is released, and may control the movement and dispensing of the compacting hoppers. A control unit is not essential, however, and in some embodiments, the dosage unit may continuously supply flavouring, as has been described above, and doses may be automatically dispensed by a compacting hopper when it reaches a dispense position, e.g. by mechanical means for actuating the compacting hopper.

In accordance with a second aspect of the present invention, there is provided a method of dispensing compacted doses of flavouring, comprising: a) dispensing a first dose of flavouring from a flavouring dosage unit, the flavouring dosage unit comprising a flavouring supply portion configured to gradually supply flavouring; b) receiving the first dose of flavouring in a first compacting hopper of a plurality of compacting hoppers; c) holding the first dose of flavouring in the first compacting hopper so as to compact the dose of flavouring; d) dispensing the compacted first dose of flavouring from the first compacting hopper to a dispense position; e) dispensing a second dose of flavouring from the flavouring dosage unit after step a) and before step d); f) receiving the second dose of flavouring in a second compacting hopper of the plurality of compacting hoppers; g) holding the second dose of flavouring in the second compacting hopper so as to compact the dose of flavouring; h) dispensing the compacted second dose of flavouring from the first compacting hopper to the dispense position.

It will be appreciated that this method is particularly suited to being performed on a system according to the first aspect of the invention. The various features described above as being advantageous to the system according to the first aspect of the invention may be replicated in the method according to this second aspect.

The above method describes only the dispensing of two doses of flavouring, although it will be appreciated that this method may be performed substantially continuously, with a subsequent dose of flavouring being dispensed after step e) and received in the first compacting hopper so as to continue the process.

BRIEF DESCRIPTION OF THE DRAWINGS

Example embodiments of the present invention will now be described with reference to the accompanying drawings, in which.

DETAILED DESCRIPTION

A first embodiment of a flavouring dispenser will now be described with reference to FIGS. 1A to 4B.

Figure 1A:
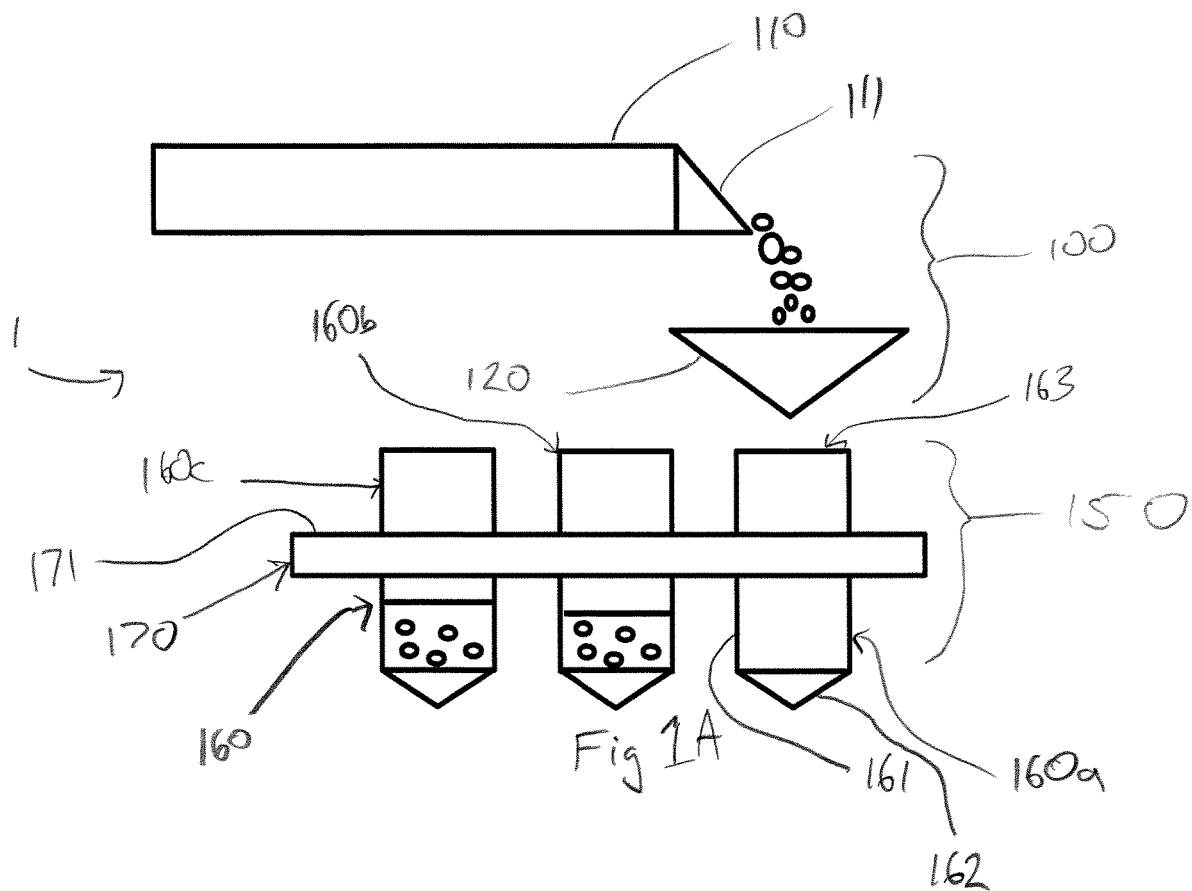
FIGS. 1A and 1B shows a system according to a first embodiment in schematic side view at first and second stages during use, respectively.

FIG. 1A schematically shows a flavouring dispenser 1, which comprises a flavouring dosage unit 100 arranged above a plurality of compacting hoppers 150.

The flavouring dosage unit 100 is configured to supply a measured dose of flavouring, in particular granular flavourings, such as potato chip seasonings, for subsequent receipt in one of the plurality of compacting hoppers 150. The flavouring dosage unit 100 comprises a flavouring supply portion 110 in the form of an auger. The auger comprises a screw (not shown in detail) that rotates in a trough to push flavouring along the trough and out of an open end 111, where it falls into a holding hopper 120. The flavouring supply unit 110 is fed with flavouring from an upstream supply (not shown in the Figures). The flavouring supply unit 110 gradually dispenses flavouring as the screw turns in the trough.

The gradually supplied flavouring is received in the holding hopper 120, which in this case is coupled to a weighing unit adapted to weigh the contents of the holding hopper 120. The holding hopper 120 comprises two doors 121*a* and 121*b*, which are actuated to open once a predetermined weight flavouring is reached and provided an empty compacting hopper 160 is arranged beneath the holding hopper 120.

Figure 1B:
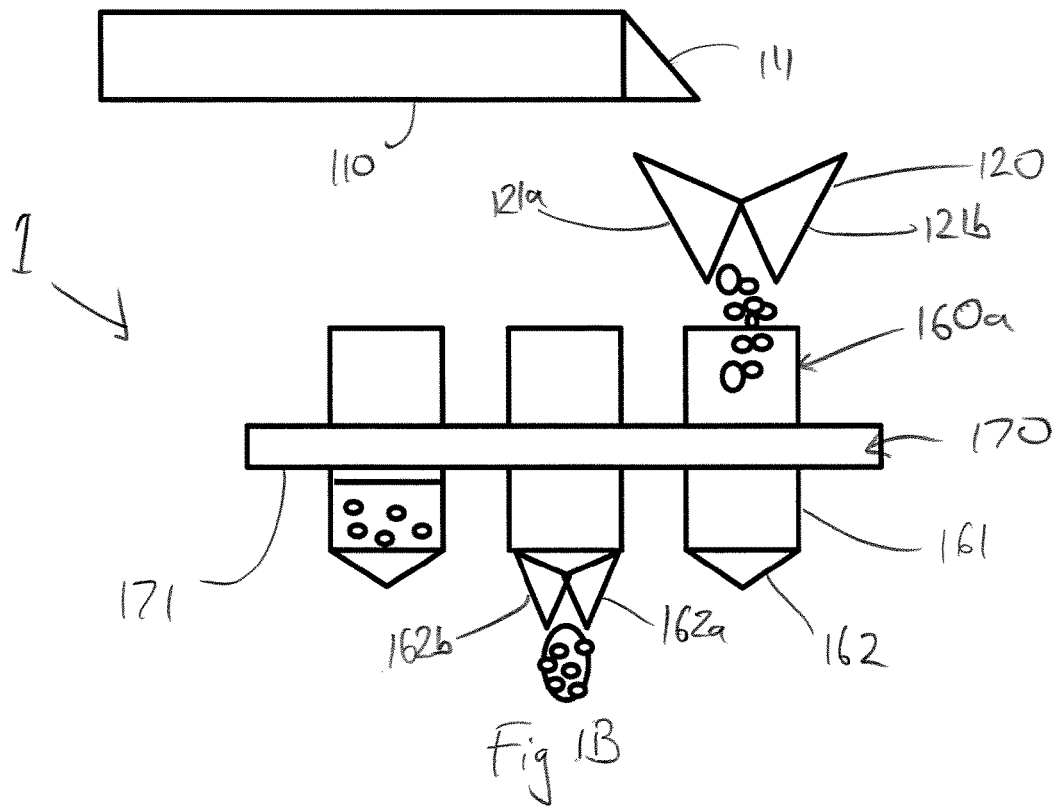
Figure 2:
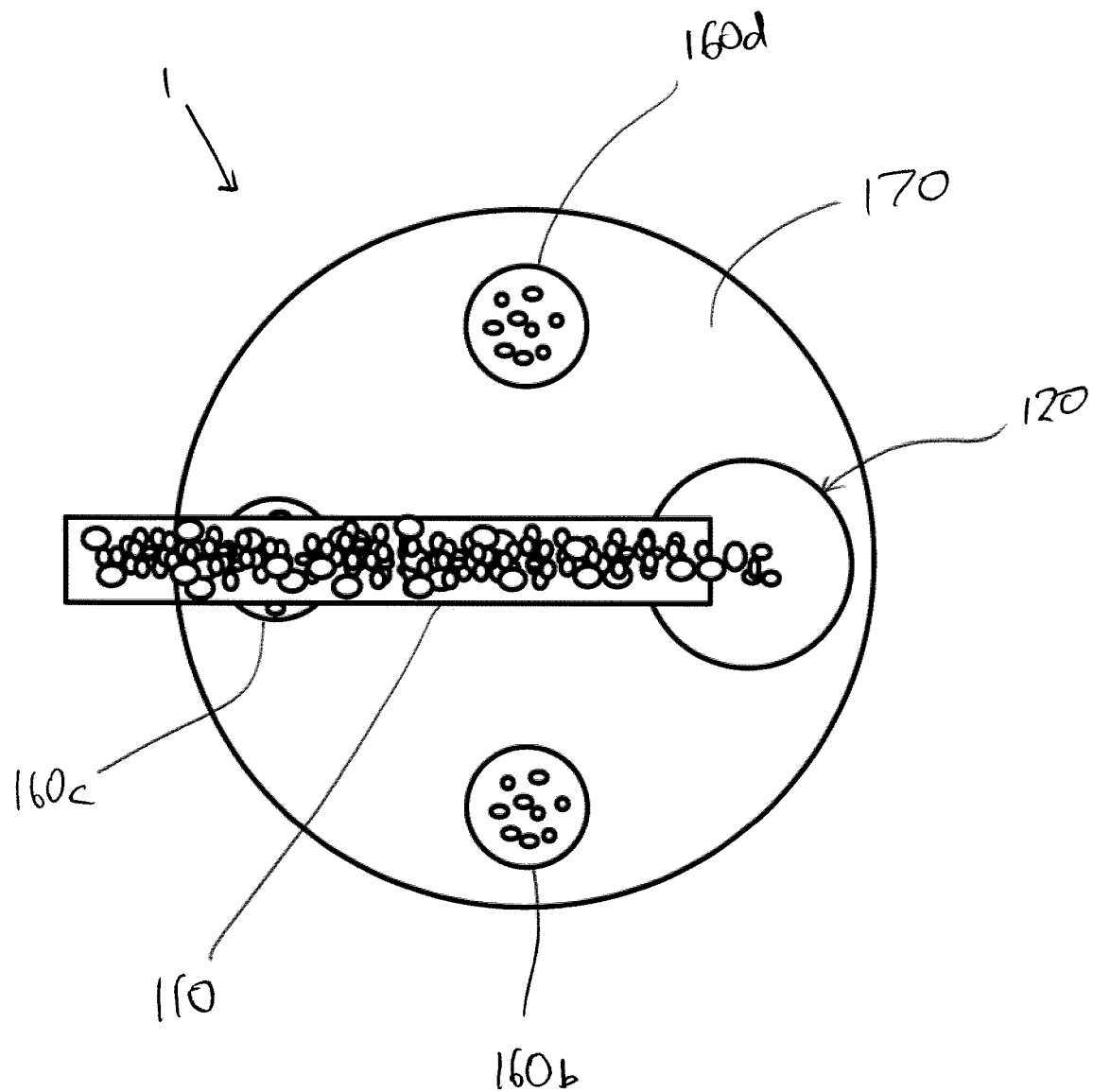
FIG. 2 shows the system according to the first embodiment in schematic top view at the first stage during use.

As mentioned above, the plurality of compacting hoppers 150 are arranged beneath the flavouring dosage units 100. The plurality of compacting hoppers includes first to fourth compacting hoppers 160*a*, 160*b*, 160*c* and 160*d*, each coupled to a compacting hopper support 170. The compacting hopper support 170 includes two rigid metal plates 171, 172, only the first of which is shown in FIGS. 1A and 1B, and this structure is described in more detail below in relation to FIG. 3. The four compacting hoppers 160*a* to 160*d* are arranged close to the periphery of the compacting hopper support 170, equally spaced from a central rotation axis of the support 170. Since four compacting hoppers are provided in this embodiment, these are spaced at 90 degree intervals about the circumference of the compacting hopper support 170. In use, the compacting hopper support 170 rotates to sequentially move each of the four compacting hoppers beneath the holding hopper 120.

Figure 3:
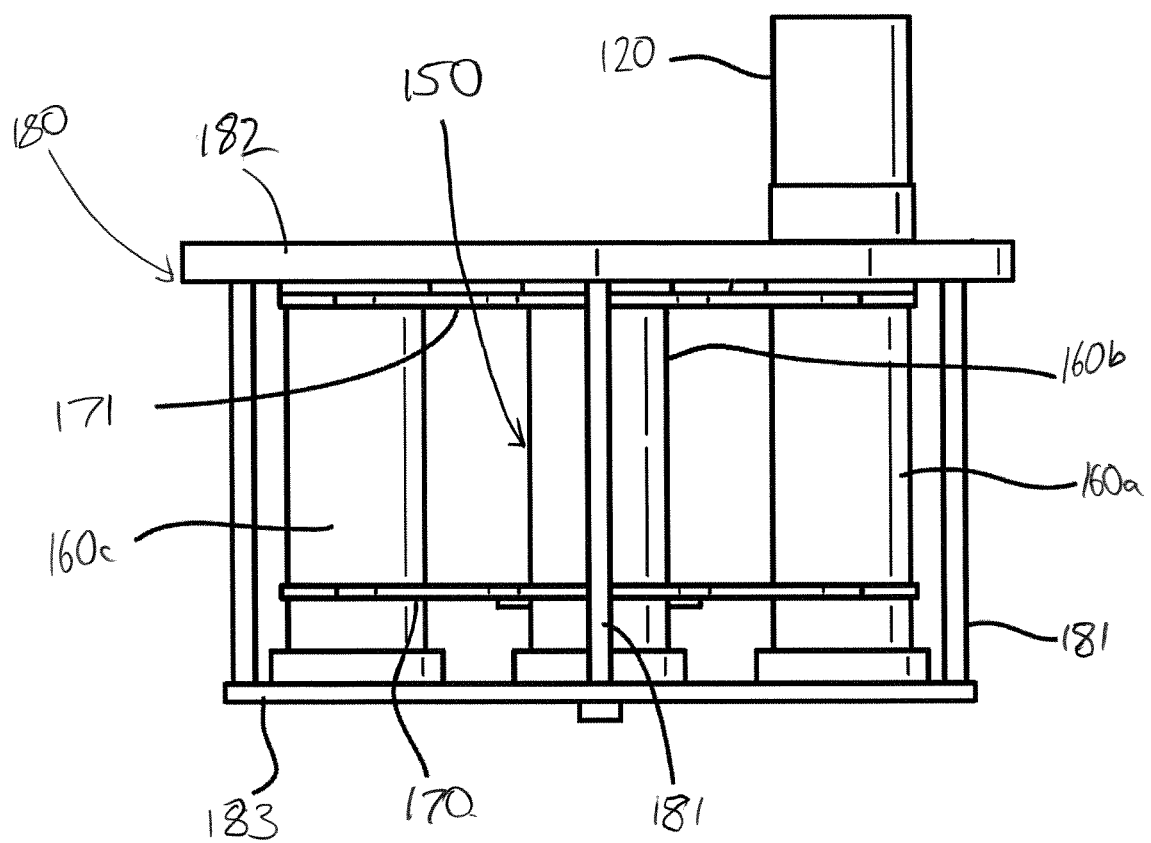
FIG. 3 shows a detailed side view of the system according to the first embodiment.

A flavouring dispenser 1 is shown in more detail in FIG. 3. As can be seen here, the flavouring dispenser comprises a support structure 180. The support structure 180 comprises a circular upper plate 182 opposed by a circular lower plate 183 and a plurality of support arms 181 extending between the upper and lower support plates 182, 183. The support structure 180 defines an interior cavity, within which the plurality of compacting hoppers 150 are located. In particular, the plurality of compacting hoppers 150 is supported by the rotatable compacting hopper support structure 170. FIG. 3 shows the first and second metal plates 171, 172, which support the compacting hoppers 160*a*, 160*b*, 160*c*, 160*d*. Each of these metal plates is arranged horizontally, with the lower plate 171 being coupled to each of the compacting hoppers near the lower ends of the compacting hoppers. The plurality of compacting hoppers are further supported by upper support plate 172, which takes the same form as the first plate 171, and which is coupled to each of the compacting hoppers near their upper end. The support plates 171 and 172 are interconnected by a central axis member (not shown in the figures) and are driven to rotate by the central axis member, so as to move the compacting hoppers within the support structure 180.

The holding hopper 120 sits on an upper surface of the upper support plate 182 of the support structure and is arranged over an aperture through the support plate 182 so that it is able to dispense flavouring into a compacting hopper 160 positioned therebeneath. The flavouring supply portion, in this case an auger, is not shown in FIG. 3 and is arranged to gradually supply flavouring through an upper opening of the generally cylindrical holding hopper 120.

Figure 4A:
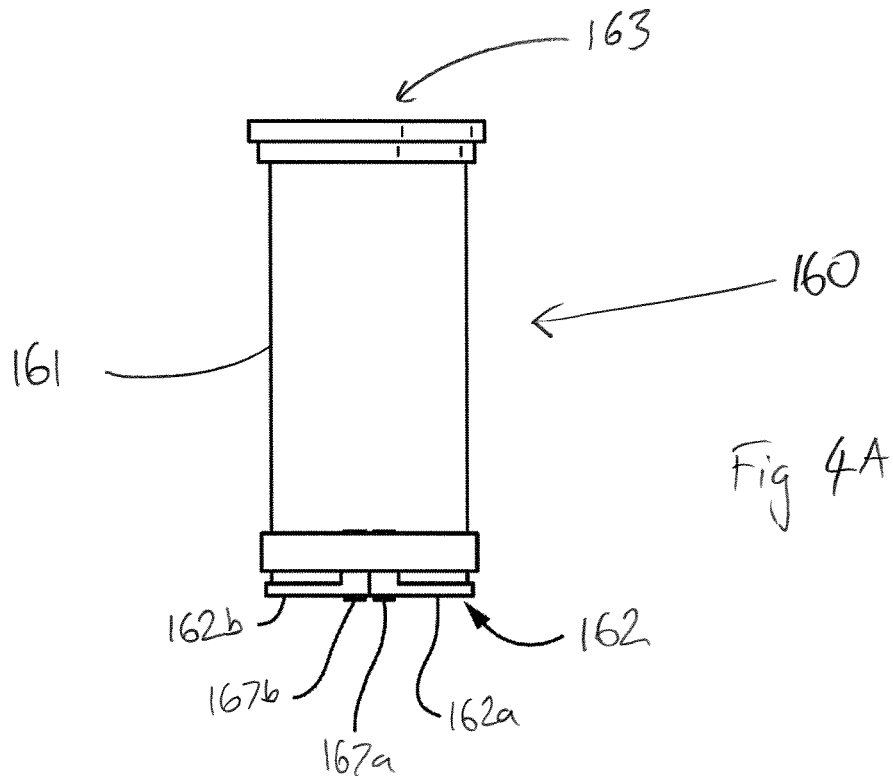
FIGS. 4A and 4B show a compacting hopper suitable for use in the system according to the first embodiment in side view and perspective view respectively
Figure 4B:
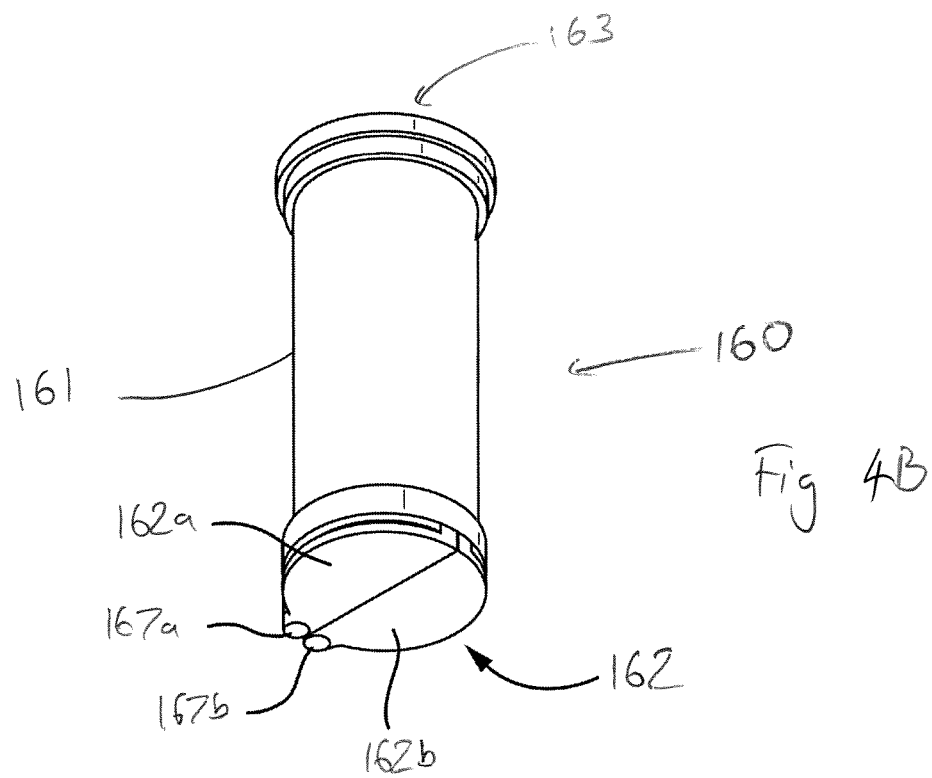

As can be seen in FIGS. 4A and 4B, each compacting hopper 160 comprises a substantially cylindrical housing 161, which receives a dose of flavouring in use. The substantially cylindrical housing 161 is arranged substantially vertically and defines a circular upper opening 163, through which flavouring is received from the holding hopper 120, as demonstrated schematically in FIG. 1B. A lower end of each compacting hopper 160 is closed by a set of doors 162. As can been seen in FIG. 4B, the compacting hopper doors comprise two substantially half-circular plates 162*a*, 162*b* that together close the lower opening of the compacting hopper. Each hopper door 162*a*, 162*b* is connected to a periphery of the lower opening of the compacting hopper by respective hinges 167*a*, 167*b* at a corner of the half-circular plate, which enable each half circular plate to rotate about the respective corner so as to open the compacting hopper door 162. Opening of the compacting hopper doors 162, when the compacting hopper is located above a circular dispense opening through bottom support plate 183, causes the compacted dose of flavouring to be dispensed for downstream processing.

Operation of the flavouring dispenser shown in FIGS. 1 to 4B will now be described with reference to FIG. 5.

Figure 5:
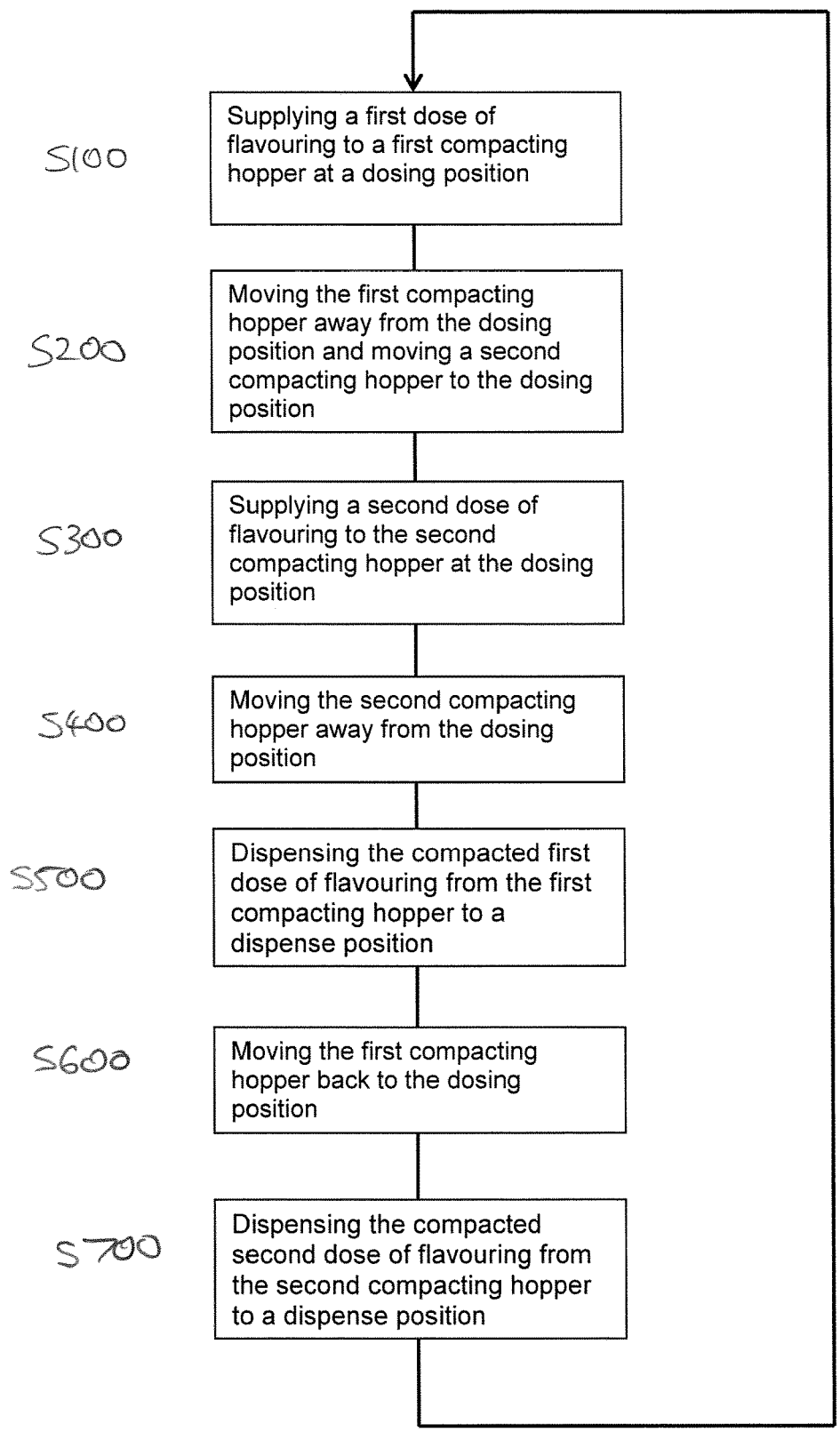
FIG. 5 is a flow diagram illustrating a method of operating the system according to the first embodiment.

FIG. 5 is a flow diagram illustrating the steps required to dispense the first two doses of flavouring from the flavouring dispenser 1 shown in the preceding Figures. It will be appreciated that, since this flavouring dispenser comprises four compacting hoppers 160*a*, 160*b*, 160*c*, 160*d*, four doses of flavouring will be dispensed before the system completes one full cycle. However, for ease of understanding the process, only the steps of operating the first and second compacting hoppers to dispense doses of flavouring are described and shown in FIG. 5.

In step S100, a first dose of flavouring is supplied to a first compacting hopper 160*a* located at the dosing position, i.e. located beneath the holding hopper 120. This step comprises the flavouring supply unit 110 gradually dispensing flavouring into the holding hopper 120 until a predetermined weight is reached. This process is illustrated in FIG. 1A. Once the predetermined weight is reached, the holding hopper 120 opens so as to dispense the first dose of flavouring into the first compacting hopper 160A, as shown schematically in FIG. 1B.

In step S200, the first compacting hopper is moved away from the dosing position, at which it received a dose of flavouring. Simultaneously, the second compacting hopper is moved to the dosing position, underneath the holding hopper 120. In the present system, step S200 is achieved by rotating the compacting hopper support 170 through 90 degrees, such that the first compacting hopper 160*a*, located beneath the holding hopper 120 in FIGS. 1A to 3, is moved to the position occupied by the fourth compacting hopper 160*d*, which can be seen in FIG. 2.

This movement of the first compacting hopper moves the second compacting hopper 160*b* from its position in FIGS. 1A to 3 to the dosing position, beneath the holding hopper 120.

In step S300, a second dose of flavouring is supplied to the second compacting hopper at the dosing position. Step S300 comprises the flavouring supply portion 110 gradually supplying flavouring into the holding hopper 120 until a predetermined weight is reached. While step S300 is indicated as occurring after step S200, it will be appreciated that the process of filling the holding hopper 120 with flavouring may begin at any point after the holding hopper 120 has returned to its closed position. For example, this may begin while the compacting hoppers are being moved in step S200.

In step S400, the second compacting hopper, having received a dose of flavouring, is moved away from the dosing position. In the system shown in FIGS. 1 to 3, rotation of the compacting hopper support 170 to move the second compacting hopper 160B away from the holding hopper 120 will simultaneously move the third compacting hopper 160C to the dosing position, beneath the holding hopper 120. In practice, this third compacting hopper will typically receive a third dose of flavouring in substantially the same manner described with reference to the first and second compacting hoppers. The dosing plate may then rotate again through 90 degrees to bring the fourth compacting hopper to the dosing position beneath the holding hopper 120. Again, typically the fourth compacting hopper will receive a fourth dosing flavouring in substantially the same manner described above with respect to the first to third compacting hoppers.

In step S500, the compacted first dose of flavouring is dispensed from the first compacting hopper 160a. In this case, the first compacting hopper 160a dispenses it dose of flavouring at a dispensing position, which is the positon 270° from the dosing position, i.e. the position shown as occupied by the second compacting hopper 160b in FIG. 2. This position corresponds to a positon that is only one 90° degree rotation of the compacting hopper support 170 from returning beneath the holding hopper 120.

It will be evident from the above that the first dose of flavouring has had time to compact in the first compacting hopper 160a while the second, third, and possibly fourth compacting hoppers 160b, 160c and 160d have been receiving flavouring. Furthermore, the movement of the compacting hopper 160a as the compacting hopper support 170 rotates may promote settling and compacting of the flavouring held within the compacting hopper.

In step S600, the first compacting hopper 160a is returned back to the dosing position, beneath the holding hopper 120, by a further rotation of the support plate 170 through 90 degrees. This movement of the first compacting hopper 160a to the dosing positon also moves the second compacting hopper 160b to the dispense position.

In step S700, the compacted second dose of flavouring is dispensed from the second compacting hopper 160b while at the dispense position. It will be appreciated that the first compacting hopper 160a is now located at the dosing positon and ready to receive a subsequent dose of flavouring, such that the method steps can repeat from step S100. Similarly to the first and second compacting hoppers, any doses of flavouring located in the third and fourth compacting hoppers should be dispenses by the flavouring dispenser once the corresponding compacting hopper is located at the dispense position.

A second embodiment of a flavouring dispenser will now be described with reference to FIGS. 6 to 9B.

Figure 6:
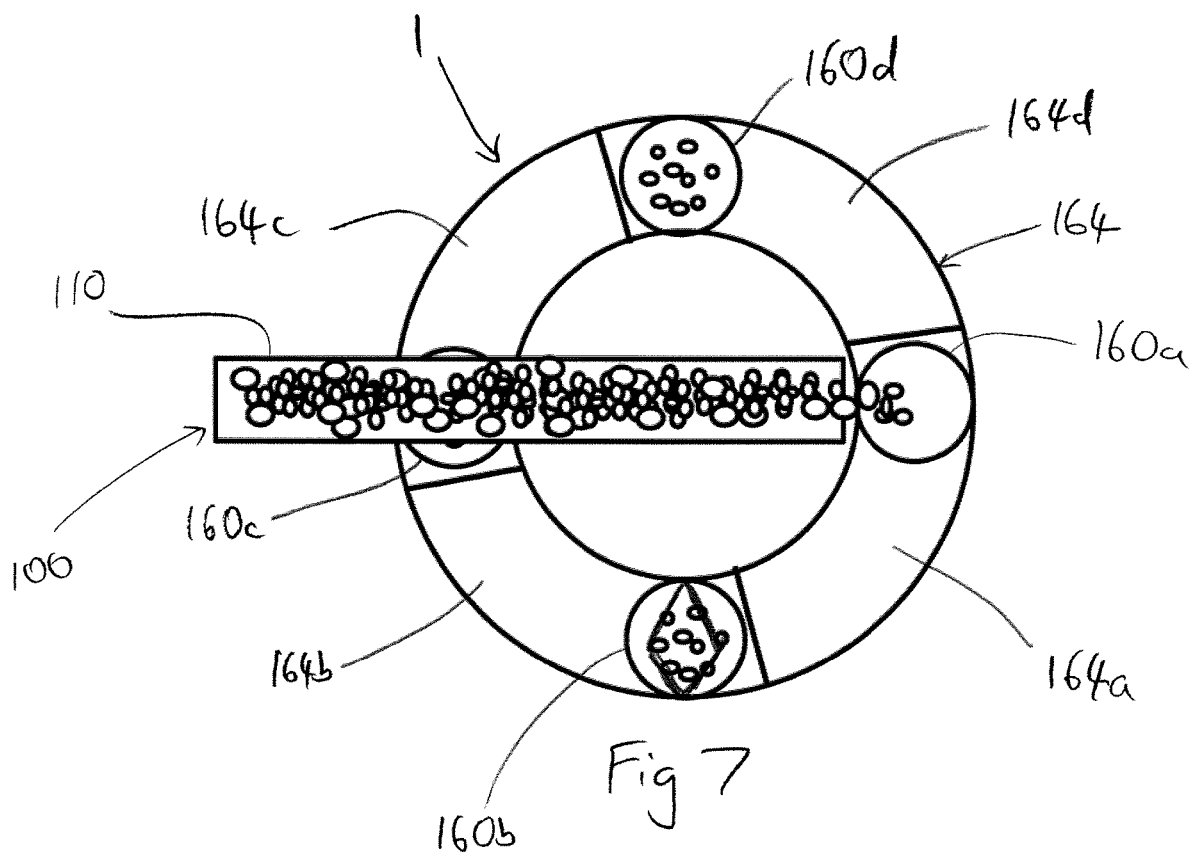
FIG. 6 shows a system according to a second embodiment in schematic side view at a first stage during use.

The flavouring dispenser 1 shown schematically in FIG. 6 comprises a flavouring dosage unit 100 arranged above a plurality of compacting hoppers 150. In this example, the flavouring dosage unit 100 comprises flavouring supply portion 110, again in the form of an auger, configured to gradually supply flavouring. In contrast with the embodiment of FIGS. 1 to 4B, this flavouring dispenser does not include a holding hopper and, instead, the flavouring supply portion 110 gradually dispenses flavouring directly into the plurality of compacting hoppers 150.

Figure 7:
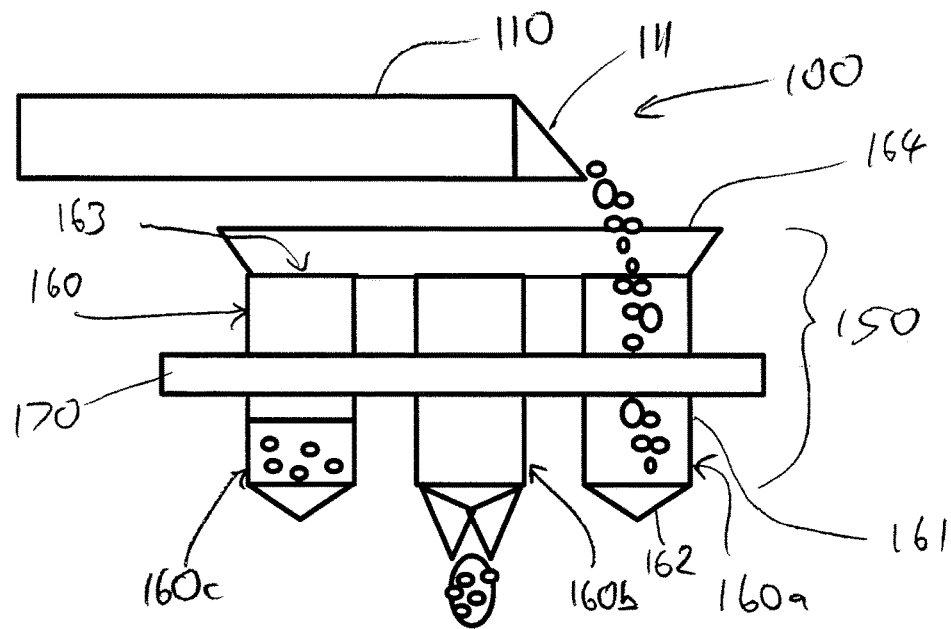
FIG. 7 shows the system according to the second embodiment in partial schematic top view at the first stage during use.

The plurality of compacting hoppers 150 again comprises four compacting hoppers 160a, 160b, 160c and 160d supported by a compacting hopper support structure 170. In order to be directly supplied with flavouring from the flavouring supply portion 110, a funnel member 164 is provided at the top of each of the plurality of compacting hoppers 150. In particular, the four separate funnel portions 164a, 164b, 164c, 164d, each associated with a corresponding compacting hopper 160a, 160b, 160c, 160d, are arranged together to form a generally annulus shaped upper opening to the funnel structure. This generally annulus shaped upper opening of the funnel structure thereby ensures that flavouring supplied by the flavouring dosage unit 100 will always be received in one of the four funnels, and thereby enter one of the four compacting hoppers 160a, 160b, 160c, 160d, regardless of the rotational position of the compacting hopper support structure 170. FIG. 7 shows the flavouring dispenser 1 in schematic plan view with the support structure 180 and the compacting hopper support 170 omitted so as to clearly illustrate the interaction between the flavouring dosage unit 100 and the funnel portions 164a, 164b, 164c, 164d. FIG. 9B shows a detailed plan view of the arrangement of the four compacting hopper 160a, 160b, 160c, 160d and their corresponding funnel portions 164a, 164b, 164c, 164d. As shown here, each funnel member 164 defines an arced footprint in pan view such that when the four compacting hoppers are arranged next to one another, the funnel members 164 together define a substantially continuous annulus-shaped upper opening to the plurality of compacting hoppers.

Figure 8:
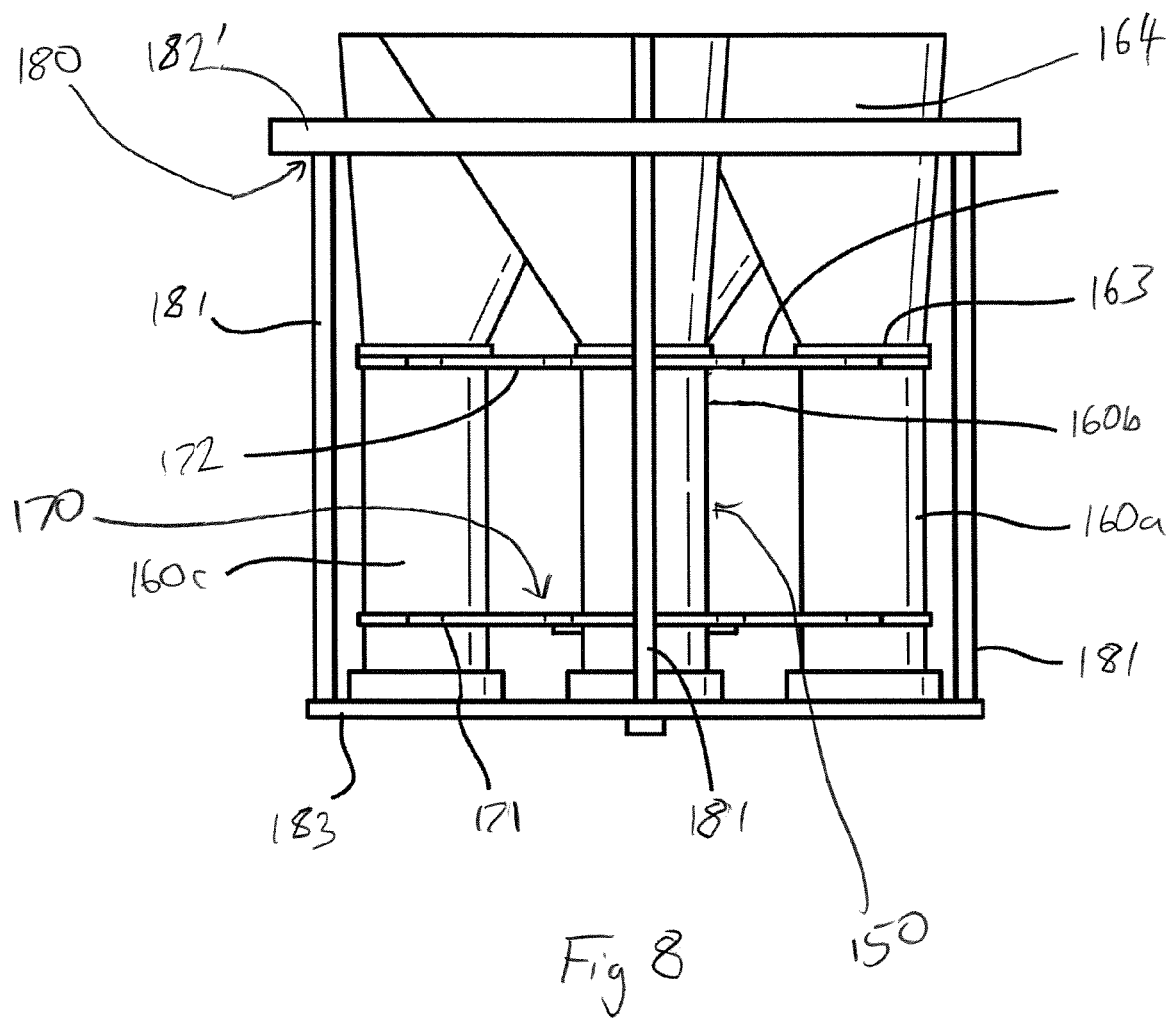
FIG. 8 shows a detailed side view of the system according to the second embodiment.

The flavouring dispenser shown schematically in FIG. 6 is shown in detailed side view in FIG. 8. Again, in this Figure, the flavouring supply portion 110, in the form of an auger, is not shown for clarity.

The flavouring dispenser comprises a support structure 180, this time comprising an annulus-shaped upper plate 182' defining a large central aperture, the upper plate again being opposed by lower plate 183 and having support arms 181 extending between the opposing support plates. The plurality of compacting hoppers 150 are again positioned within an interior cavity defined between two opposing support plates 182' and 183. However, the funnel portions 164a, 164b, 164c, 164d of each of the compacting hoppers extend through the large central aperture of the annulus-shaped upper plate 182' so as to be closer beneath the flavouring dosage unit 100. As with the first embodiments, the compacting hoppers, together with the corresponding funnel portions, are rotated within the interior cavity of the support structure 180 by a compacting hopper support structure 170, which again comprises first and second plates 171, 172 arranged so as to rotate about a central axis.

Figure 9A:
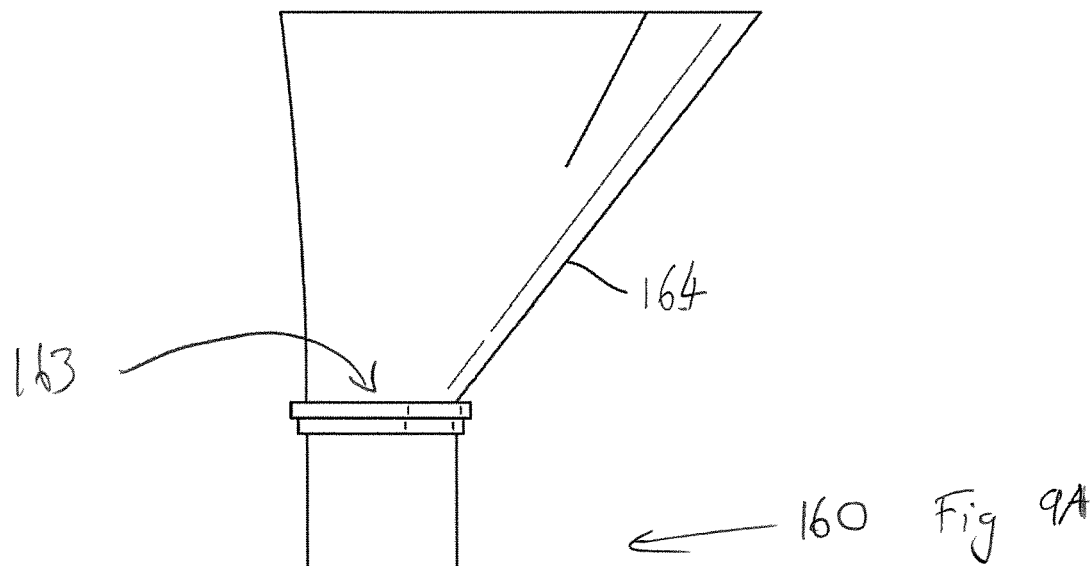
FIGS. 9A and 9B show a compacting hopper suitable for use in the system according to the second embodiment in a side view, and four such compacting hoppers arranged for use in a top view, respectively.
Figure 9B:
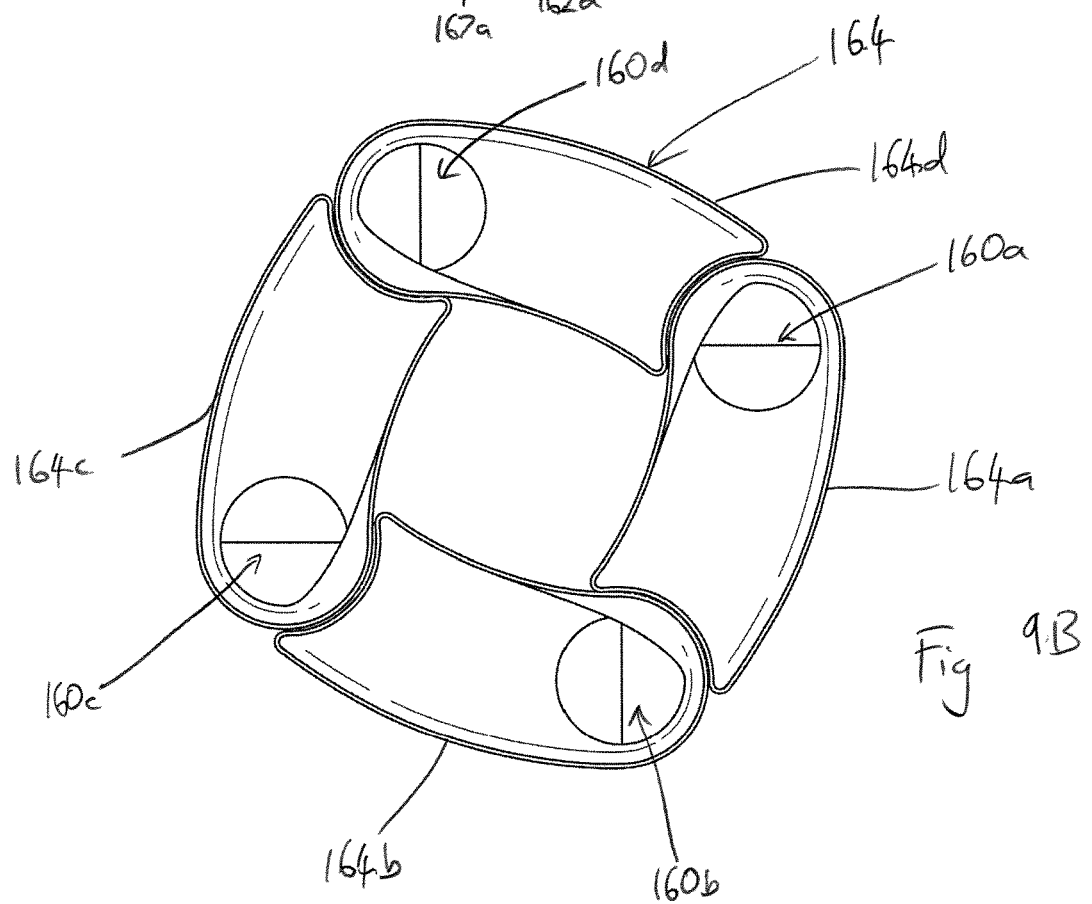

A single compacting hopper according to this second embodiment, including the funnel portion 163, is shown in FIG. 9A. The compacting hopper 160 comprises a cylindrical lower housing 161, which defines the upper opening 163 to the compacting hopper and the lower opening that is closed by compacting hopper doors 162. As shown in FIG. 9A, the funnel portion 164 is integrally formed with the cylindrical lower housing 161 and extends away from the upper opening 163 defined by the compacting hopper housing 161.

The arrangement of the compacting hoppers 160 in the present embodiment provides that the flavouring dosage unit 100 may gradually and continuously supply flavouring while the plurality of compacting hoppers may be continuously rotated, rather than rotated in an indexed manner. As noted above, the funnel arrangement ensures that any flavouring dispensed by the flavouring dosage unit 100 will be received in one of the compacting hoppers 160a, 160b, 160c, 160d, regardless of the rotational position of the plurality of compacting hoppers.

The invention claimed is:

1. A flavouring dispenser for dispensing compacted doses of flavouring, the flavouring dispenser comprising:
a flavouring dosage unit configured to dispense a dose of flavouring;
a plurality of settling hoppers, each configured to receive and hold a dose of flavouring dispensed from the flavouring dosage unit to allow the received dose of flavouring to settle and to subsequently dispense the dose of flavouring to a dispense position;
wherein the flavouring dosage unit and the plurality of settling hoppers are arranged to sequentially supply a dose of flavouring from the flavouring dosage unit to each of the plurality of settling hoppers; and wherein the flavouring dosage unit comprises a flavouring supply portion configured to gradually supply the flavouring forming each dose of flavouring over a longer period of time than is taken for a dose of flavouring to be dispensed from one of the plurality of settling hoppers.

2. A flavouring dispenser according to claim 1, wherein the flavouring dosage unit comprises a holding hopper arranged to receive and hold the flavouring gradually supplied by the flavouring supply portion, and wherein the holding hopper periodically dispenses the supplied flavouring for receipt in one of the plurality of settling hoppers to periodically dispense doses of flavouring from the flavouring dosage unit.

3. A flavouring dispenser according to claim 1, wherein the flavouring dosage unit comprises a dispensing portion from which the dose of flavouring is dispensed for receipt in one of the plurality of settling hoppers, and wherein the dispensing portion of the flavouring dosage unit and the plurality of settling hoppers are movable relative to one another while the flavouring dosage unit sequentially supplies a dose of flavouring to each of the plurality of settling hoppers.

4. A flavouring dispenser according to claim 3, wherein each of the plurality of settling hoppers is sequentially movable from a first position, at which the settling hopper receives flavouring dispensed from the flavouring dosage unit, to a second position laterally offset from the first position, at which the settling hopper dispenses the compacted dose of flavouring.

5. A flavouring dispenser according to claim 4, wherein each of the plurality of settling hoppers is movable about a closed path sequentially between the first position and the second position.

6. A flavouring dispenser according to claim 5, wherein the plurality of settling hoppers are coupled to one another and movement of one of the plurality of settling hoppers away from the first position causes movement of another settling hopper towards the first position.

7. A flavouring dispenser according to claim 6, wherein each of the plurality of settling hoppers is mounted on a rotatable support, wherein rotation of the rotatable support causes each of the plurality of settling hoppers to move sequentially between the first position and the second position about a substantially circular path.

8. A flavouring dispenser according to claim 3, wherein each settling hopper comprises an upper opening through which flavouring is received and wherein the upper opening of each settling hopper abuts the upper opening of the or each adjacent settling hopper and flavouring may be substantially continuously dispensed by the flavouring dosage unit and received in one of the settling hoppers during the relative movement of the dispensing portion of the flavouring dosage unit and the plurality of settling hoppers.

9. A flavouring dispenser according to claim 8, wherein the upper opening of each settling hopper is provided by a funnel member of the settling hopper.

10. A flavouring dispenser according to claim 3, wherein the relative movement of the dispensing portion of the flavouring dosage unit and the plurality of settling hoppers is substantially continuous, or wherein the relative movement comprises an indexed movement of the dispensing portion of the flavouring dosage unit relative to the plurality of settling hoppers.

11. A flavouring dispenser according to claim 1, wherein the plurality of settling hoppers comprises at least a first settling hopper, a second settling hopper and a third settling hopper.

12. A flavouring dispenser according to claim 11, wherein the first settling hopper receives a dose of flavouring from the flavouring dosage unit and subsequently holds the dose of flavouring while the second settling hopper receives a dose of flavouring from the flavouring dosage unit, and wherein the first settling hopper subsequently dispenses the dose of flavouring at least after the third settling hopper begins to receive a dose of flavouring from the flavouring dosage unit.

13. A flavouring dispenser according to claim 1, further comprising a control unit configured to control the flavouring dosage unit and the plurality of settling hoppers.

14. A method of dispensing compacted doses of flavouring, comprising:
a) dispensing a first dose of flavouring from a flavouring dosage unit, the flavouring dosage unit comprising a flavouring supply portion configured to gradually supply flavouring;
b) receiving the first dose of flavouring in a first settling hopper of a plurality of settling hoppers;
c) holding the first dose of flavouring in the first settling hopper so as to compact the dose of flavouring;
d) dispensing the compacted first dose of flavouring from the first settling hopper to a dispense position, wherein the first dose of flavouring is dispensed by the flavouring supply portion over a longer period of time than is taken for the first dose of flavouring to be dispensed from the first settling hopper;
e) dispensing a second dose of flavouring from the flavouring dosage unit after step a) and before step d);
f) receiving the second dose of flavouring in a second settling hopper of the plurality of settling hoppers;
g) holding the second dose of flavouring in the second settling hopper so as to compact the dose of flavouring;
h) dispensing the compacted second dose of flavouring from the second settling hopper to the dispense position wherein the second dose of flavouring is dispensed by the flavouring supply portion over a longer period of time than is taken for the second dose of flavouring to be dispensed from the second settling hopper.

15. A method according to claim 14, performed using a flavouring dispenser according to claim 1.

\* \* \* \* \*